United States Patent
Yanase et al.

(10) Patent No.: US 8,460,064 B2
(45) Date of Patent: Jun. 11, 2013

(54) METHOD OF DRESSING BARREL WORM-SHAPED TOOL, DRESSING APPARATUS, AND INTERNAL-GEAR GRINDING MACHINE

(75) Inventors: Yoshikoto Yanase, Ritto (JP); Masashi Ochi, Ritto (JP); Hiroshi Gunbara, Hikawa (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 572 days.

(21) Appl. No.: 12/668,593

(22) PCT Filed: Aug. 12, 2008

(86) PCT No.: PCT/JP2008/064440
§ 371 (c)(1),
(2), (4) Date: Jun. 28, 2010

(87) PCT Pub. No.: WO2009/025198
PCT Pub. Date: Feb. 26, 2009

(65) Prior Publication Data
US 2010/0272534 A1    Oct. 28, 2010

(30) Foreign Application Priority Data
Aug. 17, 2007  (JP) .................................. 2007-212607

(51) Int. Cl.
*B24B 1/00* (2006.01)
(52) U.S. Cl.
USPC ........................................... 451/56; 451/443
(58) Field of Classification Search
USPC ........................... 451/56, 443, 444, 9–11, 47
See application file for complete search history.

(56) References Cited

U.S. PATENT DOCUMENTS

| | | | | | |
|---|---|---|---|---|---|
| 2,228,965 | A | * | 1/1941 | Miller | .............................. 407/27 |
| 2,228,967 | A | * | 1/1941 | Miller | .............................. 76/115 |
| 4,175,537 | A | | 11/1979 | Wiener | |
| 5,289,815 | A | | 3/1994 | Krenzer | |
| 5,645,467 | A | * | 7/1997 | Schriefer | ........................... 451/8 |

FOREIGN PATENT DOCUMENTS

| | | |
|---|---|---|
| DE | 42 07 511 A1 | 9/1993 |
| JP | 50-50972 A | 5/1975 |

(Continued)

OTHER PUBLICATIONS

Hoyashita, "Barrel Worm-Shaped Tool with Conjugate Cutting-Edge Profile Generated from Tooth Profile of Internal Gear", Journal of the Japan Society of Mechanical Engineers (Series C), vol. 62, No. 593, Jan. 1996, pp. 284-290.

*Primary Examiner* — Dung Van Nguyen
(74) *Attorney, Agent, or Firm* — Birch, Stewart, Kolasch & Birch, LLP

(57) ABSTRACT

In a method of dressing a barrel worm-shaped tool, a disc-shaped disc dresser (13) meshes with a barrel worm-shaped grinding wheel (12) having its diameter gradually increasing from the two end portions in the axial direction thereof towards the middle portion thereof and used to grind an internal gear (11). The barrel worm-shaped grinding wheel (12) rotates around a tool-rotating shaft (B) disposed at a predetermined shaft angle (A1) with a vertical work-rotating shaft (C1) for the internal gear (11). The disc dresser (13) rotates around a dresser-rotating shaft (D), the disc dresser (13) being disposed at an angle equal to a helix angle of the internal gear (11). While the barrel worm-shaped grinding wheel (12) and the disc dresser (13) mesh with each other and are rotating, the barrel worm-shaped grinding wheel (12) and the disc dresser (13) revolve relative to each other within a horizontal plane.

17 Claims, 9 Drawing Sheets

FOREIGN PATENT DOCUMENTS

| JP | 60-80520 A | 5/1985 |
| JP | 7-223118 A | 8/1995 |
| JP | 8-510696 A | 11/1996 |

* cited by examiner

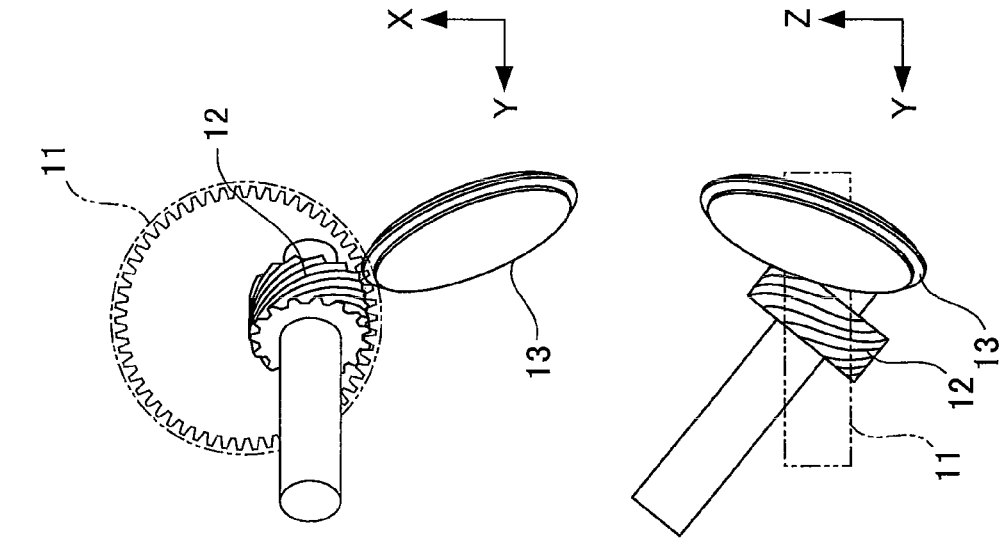

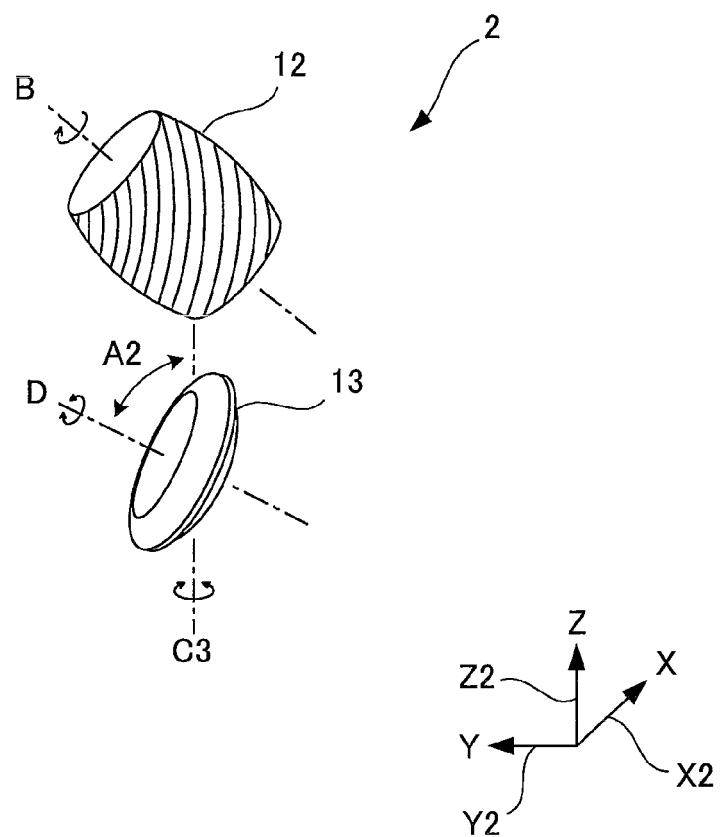

METHOD OF DRESSING BARREL WORM-SHAPED TOOL, DRESSING APPARATUS, AND INTERNAL-GEAR GRINDING MACHINE

BACKGROUND OF THE INVENTION

Technical Field

1. Field of the Invention

The present invention relates to a method of dressing a barrel worm-shaped tool used in the grinding processing that is carried out on an internal gear after the heat treatment of the gear to finish the tooth face of the gear with precision. In the dressing method, a disc-shaped disc dresser is made to mesh with the barrel worm-shaped tool to perform dressing. The invention also relates to a dressing apparatus used for this purpose, and to an internal-gear grinding machine equipped with the dressing apparatus.

2. Description of the Related Art

In a common gear-production method, a gear is firstly formed from a material of a predetermined shape through a processing including a broaching processing and a processing of cutting teeth (gear-shaper processing). The gear thus processed is then treated by heat, and, after that, the heated gear is finished (by a grinding processing) with the removal of the buckles and the like generated by the heat treatment. Various conventional-type tooth-profile grinding methods using tools such as WA grinding wheels and super-abrasive grinding wheels (e.g. diamond grinding wheels and CBN grinding wheels) have been employed for the purpose of finishing efficiently the tooth faces of the gear having been treated by heat. The tools used for this purpose has various shapes corresponding to the shapes of gears to be ground. Some of the examples of such shapes of tools include external-gear shapes, internal-gear shapes, and worm-gear shapes.

Among the various types of gears, internal gears are quite often used in such apparatuses as automotive transmissions. The demand for improvement in precision is ever growing. Under the circumstances, a tooth-profile grinding method is disclosed in Nonpatent Document 1. The disclosed method targets on the grinding and finishing tooth faces of an internal gear, with a barrel worm-shaped tool.

NONPATENT DOCUMENT Shigeru HOYASHITA, "Barrel Worm-Shaped Tool with Conjugate Cutting-Edge Profile Generated from Tooth Profile of Internal Gear," *Journal of the Japan Society of Mechanical Engineers (Series C)*, Vol. 62, No, 593, January 1996, pp. 284-290

SUMMARY OF THE INVENTION

Problems to be Solved by the Invention

The nonpatent document 1 proposes a method of calculating the cutting-edge profile of a barrel worm-shaped tool. What should be noted here is the need to carry out the dressing (reshaping) of the barrel worm-shaped tool in accordance with the frequency of its use. Accordingly, a high-precision dressing of the barrel worm-shaped tool can be also regarded as one of the factors that contribute to the production of high-quality internal gears.

The present invention, therefore, aims to achieve the above-described object. To be more specific, an object of the invention is providing a method and an apparatus of dressing, with high precision, a barrel worm-shaped tool used in the grinding of the tooth faces of an internal gear. The invention is designed also to provide an internal-gear grinding machine equipped with such a dressing apparatus.

Means for Solving the Problems

A method of dressing a barrel worm-shaped tool according to a first aspect of the present invention to achieve the above-mentioned objects is to carry out the dressing of a barrel worm-shaped tool formed to grind an internal gear and having its diameter gradually increasing from the two end portions in the axial direction thereof towards the middle portion thereof. The dressing is carried out by making a disc-shaped disc dresser mesh with the barrel worm-shaped tool. The method is characterized as follows. The barrel worm-shaped tool is made to rotate around a tool-rotating shaft disposed at a predetermined shafts-crossing angle with a vertical work-rotating shaft for the internal gear. The disc dresser is made to rotate around a dresser-rotating shaft, the disc dresser being disposed at an equal angle to a helix angle of the internal gear. The barrel worm-shaped tool and the disc dresser which mesh with each other and both of which are rotating are made to revolve relative to each other within a horizontal plane.

A method of dressing a barrel worm-shaped tool according to a second aspect of the present invention to achieve the above-mentioned objects is characterized as follows. In the method of dressing a barrel worm-shaped tool according to the first aspect of the present invention, the disc dresser is made to revolve around a vertical dresser-revolving shaft.

A method of dressing a barrel worm-shaped tool according to a third aspect of the present invention to achieve the above-mentioned objects is characterized as follows. In the method of dressing a barrel worm-shaped tool according to the first aspect of the present invention, the disc dresser is made to rotate around a vertical dresser-rotating shaft, which is parallel with the work-rotating shaft and which passes on the center of the disc dresser. The barrel worm shaped tool and the disc dresser is linearly moved within a horizontal plane.

A method of dressing a barrel worm-shaped tool according to a fourth aspect of the present invention to achieve the above-mentioned objects is characterized as follows. In the method of dressing a barrel worm-shaped tool according to the first aspect of the present invention, the disc dresser is moved so as to oscillate in the vertical direction while the disc dresser is revolving.

A method of dressing a barrel worm-shaped tool according to a fifth aspect of the present invention to achieve the above-mentioned objects is characterized as follows. In the method of dressing a barrel worm-shaped tool according to the first aspect of the present invention, the disc dresser is made to revolve around the work-rotating shaft and in the circumferential direction of the internal gear.

A dressing apparatus according to a sixth aspect of the present invention to achieve the above-mentioned objects is a dressing apparatus to carry out the dressing of a barrel worm-shaped tool formed to grind an internal gear and having its diameter gradually increasing from the two end portions in the axial direction thereof towards the middle portion thereof. The dressing is carried out by making a disc-shaped disc dresser mesh with the barrel worm-shaped tool. The dressing apparatus is characterized as follows. The dressing apparatus comprises tool-rotating means that makes the barrel worm-shaped tool rotate around a tool-rotating shaft disposed at a predetermined shafts-crossing angle with a vertical work-rotating shaft for the internal gear. The dressing apparatus also comprises dresser-rotating means that makes the disc dresser rotate around a dresser-rotating shaft, the disc dresser being disposed at an equal angle to a helix angle of the internal gear. The dressing apparatus also comprises relative-revolving means that makes the barrel worm-shaped tool and the disc dresser revolve relative to each other within a horizontal plane. Here, the barrel worm-shaped tool and the disc dresser mesh with each other. Both of the barrel worm-shaped tool and the disc dresser are rotating.

A dressing apparatus according to a seventh aspect of the present invention to achieve the above-mentioned objects is characterized as follows. In the dressing apparatus according to the sixth aspect of the present invention, the relative-revolving means is dresser-revolving means that makes the disc dresser rotate around a vertical dresser-revolving shaft.

A dressing apparatus according to an eighth aspect of the present invention to achieve the above-mentioned objects is characterized as follows. In the dressing apparatus according to the sixth aspect of the present invention, the relative-revolving means further includes vertical dresser-rotating means that makes the disc dresser rotate around a vertical dresser-rotating shaft. Here, the vertical dresser-rotating shaft is parallel with the work-rotating shaft and passing on the center of the disc dresser. The vertical dresser-rotating shaft also includes moving means that makes the barrel worm shaped tool and the disc dresser move linearly within a horizontal plane.

A dressing apparatus according to a ninth aspect of the present invention to achieve the above-mentioned objects is characterized as follows. The dressing apparatus according to the sixth aspect of the present invention further comprises oscillating means that makes the disc dresser oscillate in the vertical direction while the disc dresser is revolving.

A dressing apparatus according to a tenth aspect of the present invention to achieve the above-mentioned objects is characterized as follows. The dressing apparatus according to the seventh aspect of the present invention further comprises revolving-shaft-moving means that moves the dresser-revolving shaft.

A dressing apparatus according to an eleventh aspect of the present invention to achieve the above-mentioned objects is characterized as follows. The dressing apparatus according to the seventh aspect of the present invention further comprises revolving-radius-adjusting means that adjusts the distance of the revolving radius of the disc dresser.

An internal-gear grinding machine according to a twelfth aspect of the present invention to achieve the above-mentioned objects is characterized by comprising a dressing apparatus that is described in any one of the sixth to the eleventh aspects.

Effects of the Invention

According to the present invention, a high-precision dressing of a barrel worm-shaped tool by a disc dresser is made possible by the relative revolving, within a horizontal plane, of the rotating barrel worm-shaped tool and the rotating disc dresser that mesh with each other. The barrel worm-shaped tool thus accurately dressed can be used in the grinding of tooth faces of an internal gear. What is made possible by the use of such a barrel worm-shaped tool is the production of high-quality internal gears.

BRIEF DESCRIPTIONS OF THE DRAWINGS

Parts (a), (b), and (c) of FIG. 7 are views illustrating various states of the meshing of a disc dresser with a grinding wheel while the disc dresser is being in an action of dressing the grinding wheel. Specifically, FIG. 7(a) is a view illustrating a state of meshing when the disc dresser is located at a position in a first end portion of the grinding wheel in the axial direction thereof; FIG. 7(b) is a view illustrating a state of meshing when the disc dresser is located at a position in a middle portion of the grinding wheel in the axial direction thereof; and FIG. 7(c) is a view illustrating a state of meshing when the disc dresser is located at a position in a second end portion of the grinding wheel in the axial direction thereof.

FIG. 8 is a view illustrating a support structure of a grinding wheel and a disc dresser in a dressing apparatus according to a second embodiment of the present invention.

Figure 9A:
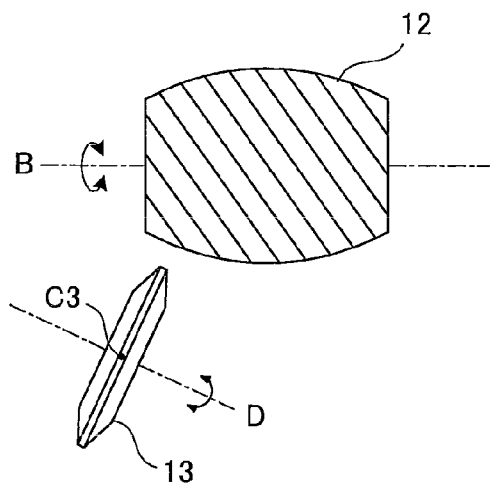
Figure 9B:
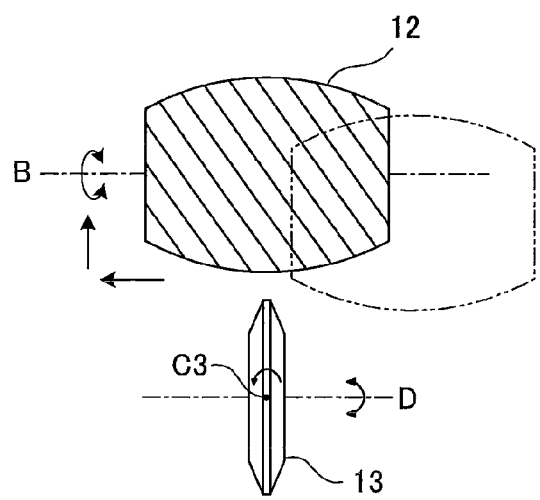
Figure 9C:
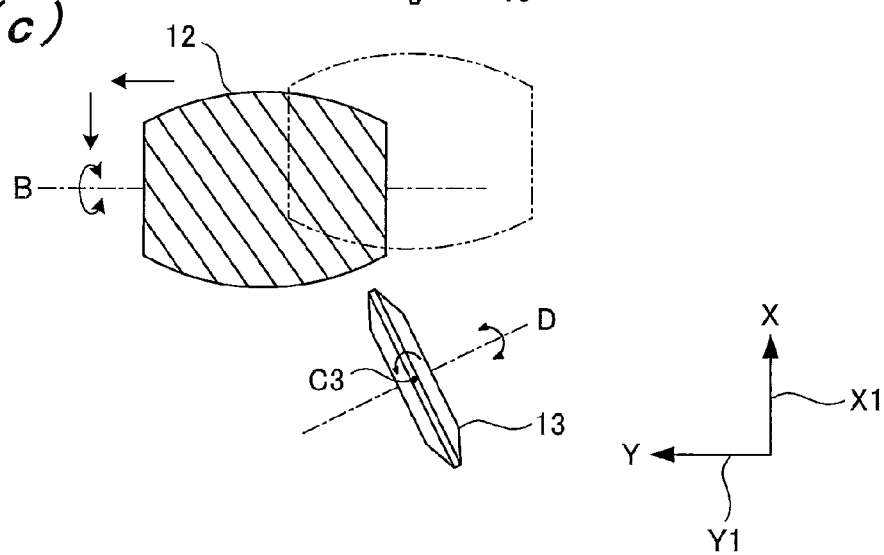

Parts (a), (b), and (c) of FIG. 9 are schematic views illustrating dressing actions of a disc dresser. FIG. 9(a) is a view illustrating a state of the moved disc dresser that is rotating at a position in a first end portion of the grinding wheel in the axial direction thereof; FIG. 9(b) is a view illustrating a state of the moved disc dresser that is rotating at a position in a middle portion of the grinding wheel in the axial direction thereof; and FIG. 9(c) is a view illustrating a state of the moved disc dresser that is rotating at a position in a second end portion of the grinding wheel in the axial direction thereof.

DETAILED DESCRIPTION OF THE INVENTION

With reference to the accompanying drawings, detail descriptions will be given hereinafter for a method and an apparatus of dressing a barrel worm tool as well as for an internal-gear grinding machine according to the present invention. Members of similar structure and functions will be given identical reference signs across embodiments. The duplicated descriptions for such members will be omitted.

First Embodiment

Figure 1:
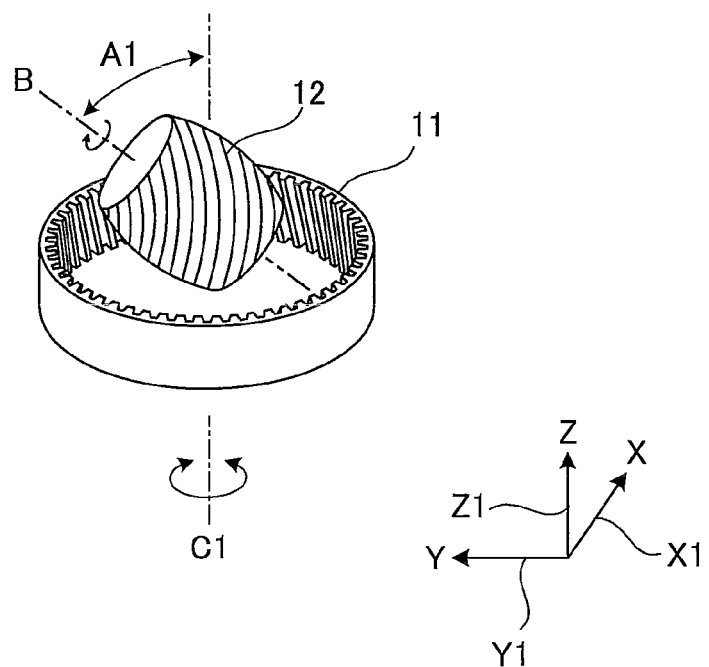
FIG. 1 is a view illustrating a support structure of an internal gear and a grinding wheel with in an internal-gear grinding machine.
Figure 2:
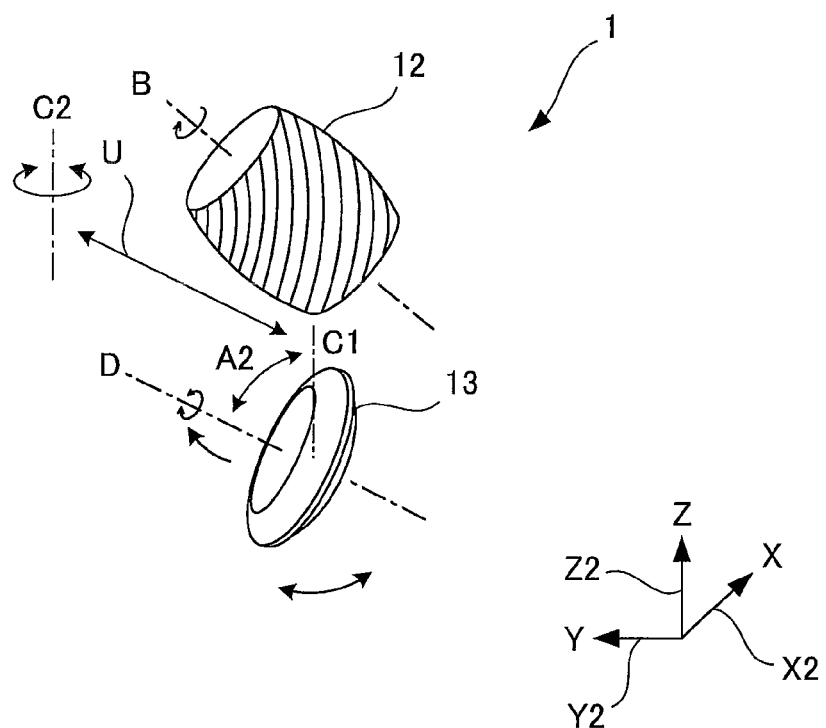
FIG. 2 is a view illustrating a support structure of a grinding wheel and a disc dresser in a dressing apparatus according to a first embodiment of the present invention.
Figure 3:
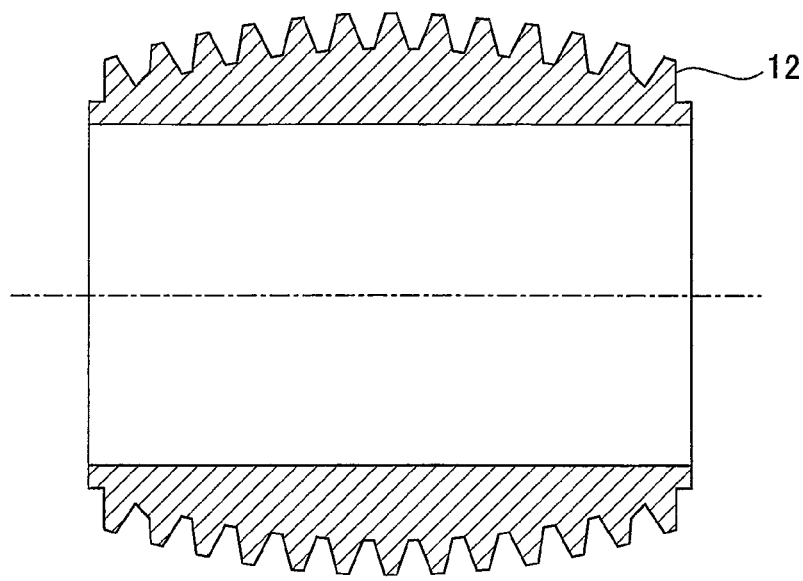
FIG. 3 is a longitudinal sectional view of a grinding wheel.
Figure 4:
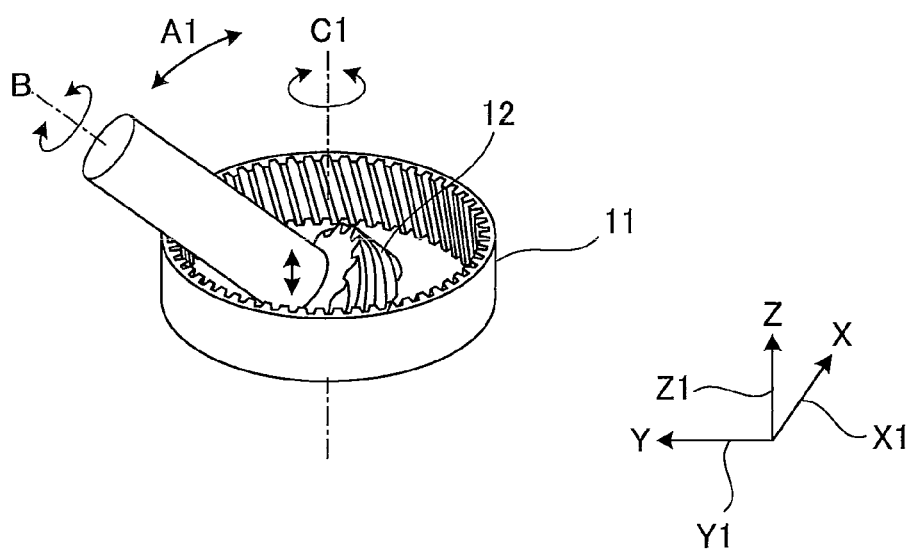
FIG. 4 is a view illustrating an internal gear that is being dressed by a grinding wheel.
Figure 5:
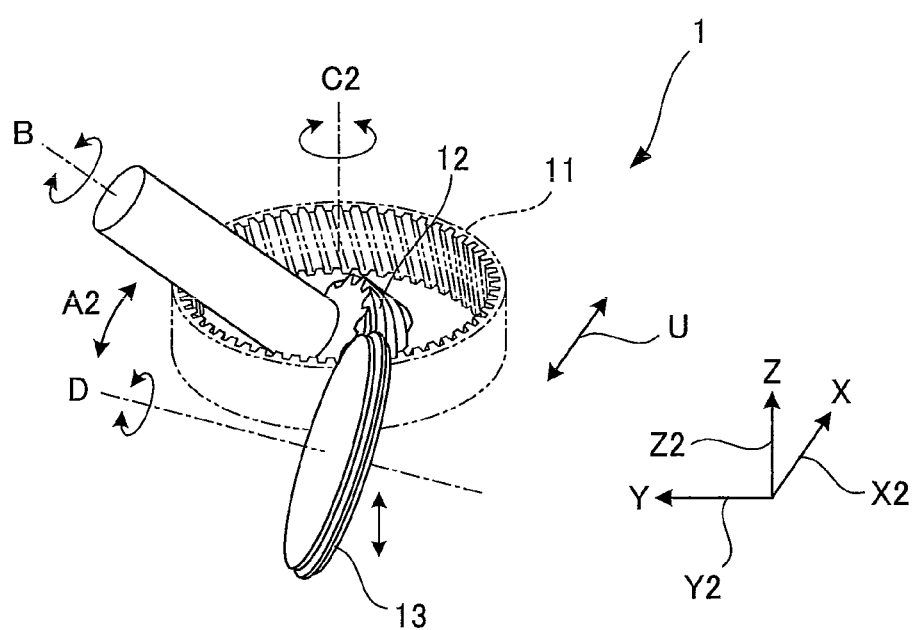
FIG. 5 is a view illustrating a disc dresser that is dressing a grinding wheel.
Figure 6:
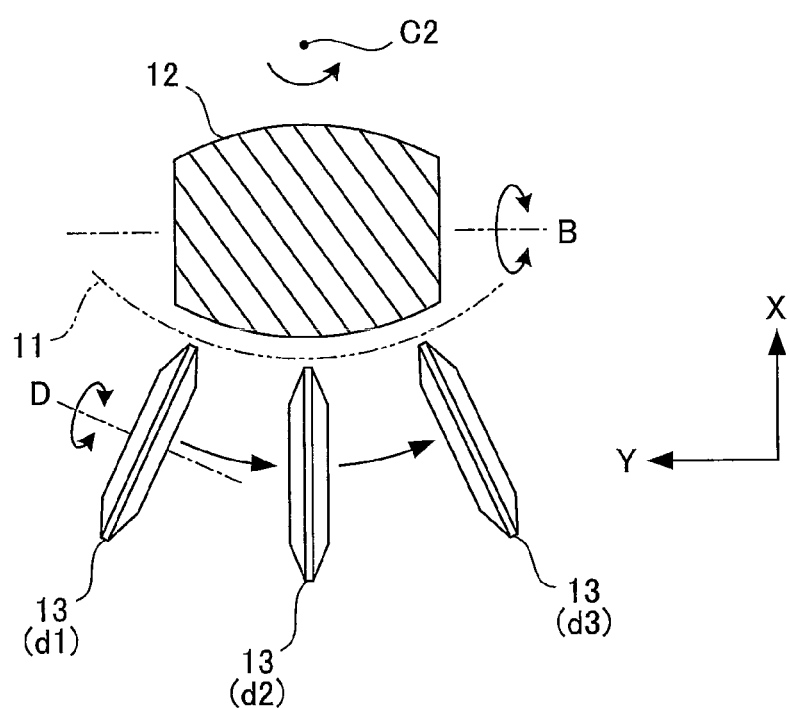
FIG. 6 is a schematic view illustrating a dressing action of a disc dresser.

FIG. 1 is a view illustrating a support structure of an internal gear and a grinding wheel within an internal-gear grinding machine. FIG. 2 is a view illustrating a support structure of a grinding wheel and a disc dresser in a dressing apparatus according to a first embodiment of the present invention. FIG. 3 is a longitudinal sectional view of a grinding wheel. FIG. 4 is a view illustrating an internal gear that is being ground by a grinding wheel. FIG. 5 is a view illustrating a disc dresser that is dressing a grinding wheel. FIG. 6 is a schematic view illustrating a dressing action of a disc dresser. FIGS. 7(a), 7(b), and 7(c) are views illustrating various states of the meshing of a disc dresser with a grinding wheel while the disc dresser is being in an action of dressing the grinding wheel. Specifically, FIG. 7(a) is a view illustrating a state of the meshing when the disc dresser is located at a position in a first end portion of the grinding wheel in the axial direction thereof; FIG. 7(b) is a view illustrating a state of the meshing when the disc dresser is located at a position in a middle portion of the grinding wheel in the axial direction thereof; and FIG. 7(c) is a view illustrating a state of the meshing when the disc dresser is located at a position in a second end portion of the grinding wheel in the axial direction thereof.

Firstly, FIG. 1 shows a barrel worm-shaped tool, which is a grinding wheel 12, provided in an unillustrated internal-gear grinding machine is grinding the tooth-faces of a work, which is internal helical gear 11. The internal-gear grinding machine is capable of dressing the grinding wheel 12 with a dressing apparatus 1 annexed to the internal-gear grinding machine. To be more specific, as FIG. 2 shows, a disc dresser 13 is used in the dressing of the grinding wheel 12.

The grinding wheel 12 is a barrel-shaped worm, as FIG. 3 shows. The diameter of the grinding wheel 12 gradually increases from each of the two end portions in the axial direction to the middle portion of the grinding wheel 12. The grinding wheel 12 has a shape of a helical gear, and has external-gear specifications that allow adequate meshing with an internal gear 11 with predetermined internal-gear specifications. The disc dresser 13 is formed in a disc shape. The edge faces of the disc dresser 13 are brought into contact with and mesh with the edge faces of the grinding wheel 12. Diamond abrasive grains are electrodeposited (coated) on the surface of the edge faces of the disc dresser 13.

As FIG. 1 shows, the internal gear 11 and the grinding wheel 12 is set in the internal-gear grinding machine. The internal gear 11 is attached rotatably around a vertical work-rotating shaft C1. The grinding wheel 12 is attached rotatably around a grinding-wheel-rotating axis B that is angled at a predetermined shaft angle (shafts-crossing angle) A1 with respect to the work-rotating shaft C1 (the mechanism configured to rotate the grinding wheel 12 can be referred to as tool-rotating means). The grinding wheel 12 is supported by: a radial shaft X1 that extends horizontally in the x-axis direction; a work-rotating-shaft direction (simply referred also to as the shaft direction) feed shaft Z1 that extends vertically in the z-axis direction; and a horizontal shaft Y1 that extends horizontally in the y-axis direction that is orthogonal to the x-axis and the z-axis direction. The grinding wheel 12 thus supported is movable in the x-axis, the y-axis, and the z-axis directions.

In addition, as FIG. 2 shows, the disc dresser 13 is set in the dressing apparatus 1 annexed to the internal-gear grinding machine. The disc dresser 13 is rotatably supported around a dresser-rotating axis D that is angled at a predetermined dresser-attaching angle A2 with respect to the work-rotating shaft C1 (the mechanism configured to rotate the disc dresser 13 around the dresser-rotating axis D can be referred to as dresser-rotating means). The disc dresser 13 is also revolvable around a vertical dresser-revolving shaft C2 (the mechanism configured to revolve the disc dresser 13 around the vertical dresser-revolving shaft C2 can be referred to either as relative-revolving means or as dresser-revolving means). The distance between the disc dresser 13 and the dresser-revolving shaft C2, which is the revolving radius, is adjustable by means of a horizontal dresser-revolving-radius set-up shaft U (the mechanism configured to adjust the revolving radius can be referred to as revolving-radius adjusting means). Beside the dresser-revolving-radius set-up shaft U, the following shafts are provided to rotatably support the disc dresser 13: a radial shaft X2 that is parallel with the radial shaft X1; a horizontal shaft Y2 that is parallel with the horizontal shaft Y1; and a work-rotating-shaft direction feed shaft Z2 that is parallel with the work-rotating-shaft direction feed shaft Z1. The disc dresser 13 thus supported is movable in the x-axis, the y-axis, and the z-axis directions.

Note that the radial shaft X2, the horizontal shaft Y2, and the work-rotating-shaft direction feed shaft Z2 together form revolving-shaft moving means. In addition, the work-rotating-shaft direction feed shaft Z2 forms oscillating means. Descriptions of these means will be given later.

The grinding of the internal gear 11 with grinding wheel 12 starts with moving the grinding wheel 12 to the machining position while the grinding wheel 12 is angled at the shaft angle A1. The radial shaft X1, the horizontal shaft Y1, and the work-rotating-shaft direction feed shaft Z1 are used for the purpose of moving the grinding wheel 12. The grinding wheel 12 thus moved is made to mesh with the internal gear 11. Then, while the internal gear 11 is made to rotate around the work-rotating shaft C1 and the grinding wheel 12 is made to rotate around the grinding-wheel-rotating axis B, the grinding wheel 12 is made to oscillate in the z-axis direction by means of the work-rotating-shaft direction feed shaft Z1. Here, the grinding wheel 12 is thus oscillated so that the edge faces of the grinding wheel 12 can be in contact with the entire area of each of the tooth faces in the width direction of the internal gear 11.

Here, both the internal gear 11 and the grinding wheel 12 that mesh with each other rotate synchronously with each other while the internal gear 11 and the grinding wheel 12 together form the shaft angle A1. Accordingly, the relative sliding speed between the tooth face of the internal gear 11 and the edge face of the grinding wheel 12 increases, and the increase in the relative speed in turn increases the grinding speed. As a consequence, the internal gear 11 is finished so that the shape of the edge face of the grinding wheel 12 can be transferred to the tooth face of the internal gear 11.

What should be noted here is that the use of the grinding wheel 12 to grind a predetermined number of the internal gears 11 may possibly cause the degradation of grinding precision of the tooth faces of the internal gear 11. To address this degradation, the dressing of the grinding wheel 12 needs to be carried out on a regular basis by driving the dressing apparatus 1.

The dressing of the grinding wheel 12 with the disc dresser starts with removing the internal gear 11 from the internal-gear grinding machine as shown in FIG. 5. Then, the grinding wheel 12 is moved to the machining position while the grinding wheel 12 is kept in the state of being angled at the shaft angle A1. The radial shaft X1, the horizontal shaft Y1, and the work-rotating-shaft direction feed shaft Z1 are used for the purpose of moving the grinding wheel 12. Then, the disc dresser 13 is moved so that the dresser-revolving shaft C2 can be located coaxially with the work-rotating shaft C1. The radial shaft X2, the horizontal shaft Y2, and the work-rotating-shaft direction feed shaft Z2 are used for the purpose of moving the disc dresser 13 in this way. In addition, the disc dresser 13 is moved, with the dresser-revolving-radius set-up shaft U, so that the disc dresser 13 can mesh with the grinding wheel 12 having been placed in the machining position. It should be noted here that the attaching angle for the disc dresser 13 is set to be equal to the helix angle of the internal gear 11. Accordingly, the setting-up for the dressing is completed.

As described above, while the grinding wheel 12 is moved to the machining position, the disc dresser 13 is moved to position where the internal gear 11 would be at the time of grinding the internal gear 11. As a consequence, the state of meshing between the grinding wheel 12 and the disc dresser 13 at the time of dressing becomes almost identical to the state of meshing between the internal gear 11 and the grinding wheel 12 at the time of grinding.

Next, the dressing action carried out by means of the dressing apparatus 1 will be described with reference to FIG. 6 and FIGS. 7(a) to 7(c).

Now, refer to FIG. 6. Firstly, the disc dresser 13 is made to revolve around the dresser-revolving shaft C2 and is thus moved to a position d1 where the disc dresser 13 can mesh with one of the end portions of the grinding wheel 12. FIG. 7(a) shows the state of meshing at this time. Then, while the grinding wheel 12 is made to rotate around the grinding-wheel-rotating axis B and the disc dresser 13 is made to rotate around the dresser-rotating axis D, the disc dresser 13 is made to revolve around the dresser-revolving shaft C2 and is thus moved from the position d1 to another position d2 where the disc dresser 13 can mesh with the middle portion of the grinding wheel 12. FIG. 7(b) shows the state of meshing at this time. After that, the disc dresser 13 is made to revolve around the dresser-revolving shaft C2 and is thus moved from the position d2 to still another position d3 where the disc dresser 13 can mesh with the other one of the end portions of the grinding wheel 12. FIG. 7(c) shows the state of meshing at this time.

In this event, the dresser-revolving shaft C2 is made to be located coaxially with the work-rotating shaft C1. In addition, the disc dresser 13 is moved so that the disc dresser 13 can mesh with the grinding wheel 12 having been located at the machining position. Accordingly, the disc dresser 13 revolves in the circumferential direction of the internal gear 11. In addition, at the time of revolving, the disc dresser 13 is made to oscillate in the z-axis direction by means of the work-rotating-shaft direction feed shaft Z2.

The oscillating movement of the disc dresser 13 in the z-axis direction together with the revolution of the disc dresser 13 from the position d1 to the position d3 makes the edge tips of the disc dresser 13 dress the bottom lands of the grinding wheel 12 and makes the edge faces of the disc dresser 13 dress the edge faces of the grinding wheel 12. With a single pass of the revolution of the disc dresser 13 from the position d1 to the position d3, the dressing of each groove portion formed by both the bottom land of the grinding wheel 12 and the edge faces thereof is carried out only on a predetermined area of the groove portion in the length direction thereof. Accordingly, once the above-mentioned single pass is finished, the disc dresser 13 is made to move in the z-axis direction (i.e. upwards) by means of the work-rotating-shaft direction feed shaft Z2, and plural pass actions are repeated. Each one of the groove portions of the grinding wheel 12 is dressed in this way. Then, similar actions are carried out for the purpose of dressing the rest of the groove portions of the grinding wheel 12.

It should be noted that the dresser-attaching angle A2 of the dresser rotating shaft D needs to be corrected in accordance with the helix angle of the grinding wheel 12 when the disc dresser 13 is oscillated in the z-axis direction. The correction carried out in this way is commonly known as the helical correction. The helical correction is not necessary when the grinding wheel 12 is a spur gear.

In addition, the edges of the grinding wheel 12 are cut out in the following way by use of a special internal helical gear that has to be prepared in a manner different from the preparation manner for the internal gear 11 for the purpose of cutting the edges. Hard grinding grains, such as diamond grinding grains, are electrodeposited on the tooth faces of the internal helical gear for edge-cutting. A column-shaped worm that is kept angled at the shaft angle A1 is made to mesh with the internal helical gear for edge-cutting. In addition, the shape of each edge face of the disc dresser 13 is set so as to be identical to the shape of each edge face of a grinding wheel of an internal-gear shape used for grinding an external gear that is set to be inscribed in and to mesh with the inner gear 11.

Accordingly, in the dressing apparatus according to the present invention, while rotating grinding wheel 12 and the rotating disc dresser 13 that mesh with each other, the disc dresser 13 is made to revolve around the vertical dresser-revolving shaft C2. The use of the dressing apparatus of the present invention thus allows the high-precision dressing of the barrel worm-shaped grinding wheel 12 to be carried out using the disc dresser 13.

In addition, the dresser-revolving shaft C2 of the disc dresser 13 is designed to be movable while the distance of the revolving radius of the disc dresser 13 is designed to be adjustable. Accordingly, the dresser-revolving shaft C2 can be located coaxially with the work-rotating shaft C1 of the internal gear 11, and the distance of the revolving radius of the dresser 13 can be made equal to the distance of the radius of the internal gear 11. As a consequence, the disc dresser 13 revolves in the circumferential direction of the internal gear 11 around the grinding wheel 12 located at the same machining position at which the grinding wheel 12 grinds the internal gear 11. Thus the dressing can be carried out by driving the grinding wheel 12 under similar machining (driving) conditions to the ones employed at the time of the grinding. No new dressing conditions have to be set. In addition, the position of the grinding wheel 12 during the grinding is the same position thereof during the dressing. What can be provided accordingly is a space-saving dressing apparatus with a simple driving control.

In addition, the above-described configuration makes it possible to grind the tooth faces of the internal gear 11 with the grinding wheel 12 thus dressed with high precision in the internal-gear grinding machine. Accordingly, the internal gear 11 of high quality can be manufactured.

Second Embodiment

FIG. 8 is a view illustrating a support structure of a grinding wheel and a disc dresser in a dressing apparatus according to a second embodiment of the present invention. FIGS. 9(a), 9(b), and 9(c) are schematic views illustrating dressing actions of a disc dresser. FIG. 9(a) is a view illustrating a state of the moved disc dresser that is rotating at a position in a first end portion of the grinding wheel in the axial direction thereof; FIG. 9(b) is a view illustrating a state of the moved disc dresser that is rotating at a position in a middle portion of the grinding wheel in the axial direction thereof; and FIG. 9(c) is a view illustrating a state of the moved disc dresser at a position in a second end portion of the grinding wheel in the axial direction thereof.

As FIG. 8 shows, the internal-gear grinding machine is equipped with a dressing apparatus 2. The dressing apparatus 2 includes a vertical dresser-rotating shaft C3 in addition to the dresser-rotating axis D that is angled at the dresser-attaching angle A2. The dressing apparatus 2 also includes the radial shaft X2, the horizontal shaft Y2, and the work-rotating-shaft direction feed shaft Z2. The vertical dresser-rotating shaft C3 is arranged so as to be parallel with the work-rotating shaft C1 and to pass through the center of the disc dresser 13. The disc dresser 13 is supported rotatably around the vertical dresser-rotating shaft C3 (the mechanism configured to rotate the disc dresser 13 can be referred to as vertical dresser-rotating means).

Note that the radial shaft X1 and the horizontal shaft Y1 together form moving means. The moving means and the vertical dresser-rotating means together form relative revolving means. Descriptions of these means will be given later.

Next, a dressing action carried out by the dressing apparatus 2 will be described with reference to FIGS. 7(a) to 7(c) and FIGS. 9(a) to 9(c).

Now, refer to FIG. 9(a). Firstly, the grinding wheel 12 is moved in the x-axis and the y-axis directions respectively by means of the radial shaft X1 and the horizontal shaft Y1. In addition, while the disc dresser 13 is kept in the state of being angled with the dresser-attaching angle A2, the disc dresser 13 is made to rotate around the vertical dresser-rotating shaft C3 so that the rotating angle can be maximized. Thus the disc dresser 13 is made to mesh with one of the two end portions of the grinding wheel 12. FIG. 7(a) shows the state of meshing at this time.

Then, as FIG. 9(b) shows, while the grinding wheel 12 is made to rotate around the grinding-wheel-rotating axis B and the disc dresser 13 is made to rotate around the dresser-rotating axis D, the grinding wheel 12 is moved in the x-axis and the y-axis directions respectively by means of the radial shaft X1 and the horizontal shaft Y1. The meshing position between the grinding wheel 12 thus moved and the disc dresser 13 is moved from the position in the above-mentioned end portion of the grinding wheel 12 to a position in the middle portion thereof. Along with the movement of the grinding wheel 12, the disc dresser 13 rotates around the vertical dresser-rotating shaft C3. Here, the rotating angle of the disc dresser 13 gradually decreases as the disc dresser comes closer to the above-mentioned middle portion. FIG. 7(b) shows the state of meshing at this time.

Subsequently, as FIG. 9(c) shows, the grinding wheel 12 is moved in the x-axis and the y-axis directions respectively by means of the radial shaft X1 and the horizontal shaft Y1. The meshing position between the grinding wheel 12 thus moved and the disc dresser 13 is moved from the position in the above-mentioned middle portion of the grinding wheel 12 to a position in the other one of the two end portions thereof. Along with the movement of the grinding wheel 12, the disc dresser 13 rotates around the vertical dresser-rotating shaft C3. Here, the rotating angle of the disc dresser 13 gradually increases as the disc dresser comes closer to the above-mentioned one of the end portions. FIG. 7(c) shows the state of meshing at this time.

In this event, the grinding wheel 12 is moved in the x-axis and the y-axis directions respectively by means of the radial shaft X1 and the horizontal shaft Y1. In addition, the disc dresser 13 is made to rotate around the vertical dresser-rotating shaft C3. Accordingly, the grinding wheel 12 and the disc dresser 13 revolve relative to each other within a horizontal plane. In addition, at the time of rotating, the disc dresser 13 is made to oscillate in the z-axis direction by means of the work-rotating-shaft direction feed shaft Z2.

As has been described thus far, the grinding wheel 12 is moved in the x-axis and y-axis directions. In addition, while the disc dresser 13 is made to rotate around the vertical dresser-rotating shaft C3, the disc dresser 13 is oscillated in the z-axis direction. Accordingly, the edge tips of the disc dresser 13 dresses the bottom lands of the grinding wheel 12, and the edge faces of the disc dresser 13 dresses the edge faces of the grinding wheel 12. With a single pass of the movement of the disc dresser 13 contacting the grinding wheel from one of the end portions thereof to the other one thereof, the dressing of each groove portion formed by both the bottom land of the grinding wheel 12 and the edge faces thereof is carried out only on a predetermined area of the groove portion in the length direction thereof. Accordingly, once the above-mentioned single pass is finished, the disc dresser 13 is made to move in the z-axis direction (i.e., upwards) by means of the work-rotating-shaft direction feed shaft Z2. Then, plural pass actions are repeated. Each one of the groove portions of the grinding wheel 12 is dressed in this way. Then, similar actions are carried out for the purpose of dressing the rest of the groove portions of the grinding wheel 12. In addition, as described above, when the disc dresser 13 is oscillated in the z-axis direction, the helical correction needs to be carried out.

Accordingly, in the dressing apparatus according to the present invention, the grinding wheel 12 and the disc dresser 13 that mesh with each other are made to rotate. In the meanwhile, the movement of the grinding wheel 12 in the x-axis and y-axis direction and the rotation of the disc dresser 13 around the vertical dresser-rotating shaft C3 allow the high-precision dressing of the barrel worm-shaped grinding wheel 12 to be carried out using the disc dresser 13. In addition, the revolving action at the time of the dressing is carried out using the radial shaft X1 and the horizontal shaft Y1 that are provided with the conventional-type internal-gear grinding machine and using the vertical dresser-rotating shaft C3 of the dressing apparatus 2. Accordingly, the number of driving shafts provided in the dressing apparatus 2 can be made as small as possible, and, eventually, the dressing apparatus 2 can be made compact in size. In addition, in the internal-gear grinding machine, the grinding wheel 12 that is dressed with high precision is used in the grinding of the tooth faces of the internal gear 11. Accordingly, the internal gear 11 of high quality can be manufactured.

INDUSTRIAL APPLICABILITY

The present invention is applicable to a dressing apparatus for a barrel worm-shaped tool.

The invention claimed is:

1. A method of dressing a barrel worm-shaped tool to carry out the dressing of a barrel worm-shaped tool formed to grind an internal gear and having its diameter gradually increasing from the two end portions in the axial direction thereof towards the middle portion thereof, the dressing being carried out by making a disc-shaped disc dresser mesh with the barrel worm-shaped tool, wherein
   the barrel worm-shaped tool is made to rotate around a tool-rotating shaft disposed at a predetermined shafts-crossing angle with respect to a vertical work-rotating shaft for the internal gear,
   the disc dresser is made to rotate around a dresser-rotating shaft, the disc dresser being disposed at an angle that is equal to a helix angle of the internal gear, and
   the barrel worm-shaped tool and the disc dresser which mesh with each other and both of which are rotating are made to revolve relative to each other within a horizontal plane.

2. The method of dressing the barrel worm-shaped tool according to claim 1, wherein the disc dresser is made to revolve around a vertical dresser-revolving shaft.

3. The method of dressing the barrel worm-shaped tool according to claim 1, wherein
   the disc dresser is made to rotate around a vertical dresser-rotating shaft, which is parallel with the work-rotating shaft and which passes on the center of the disc dresser, and
   the barrel worm shaped tool and the disc dresser is linearly moved within a horizontal plane.

4. The method of dressing the barrel worm-shaped tool according to claim 1, wherein the disc dresser is oscillated in the vertical direction while the disc dresser is revolving.

5. The method of dressing the barrel worm-shaped tool according to claim 1, wherein in that the disc dresser is made to revolve around the work-rotating shaft and in the circumferential direction of the internal gear.

6. A dressing apparatus to carry out the dressing of a barrel worm-shaped tool formed to grind an internal gear and having its diameter gradually increasing from the two end portions in the axial direction thereof towards the middle portion thereof, the dressing being carried out by making a disc-shaped disc dresser mesh with the barrel worm-shaped tool, the dressing apparatus comprising:
- a tool-rotating unit that makes the barrel worm-shaped tool rotate around a tool-rotating shaft disposed at a predetermined shafts-crossing angle with respect to a vertical work-rotating shaft for the internal gear,
- a dresser-rotating unit that makes the disc dresser rotate around a dresser-rotating shaft, the disc dresser being disposed at an equal angle to a helix angle of the internal gear, and
- a relative-revolving unit that makes the barrel worm-shaped tool and the disc dresser revolve relative to each other within a horizontal plane, the barrel worm-shaped tool and the disc dresser meshing with each other, and both of the barrel worm-shaped tool and the disc dresser being rotating.

7. The dressing apparatus according to claim 6, wherein the relative-revolving unit is a dresser-revolving unit that makes the disc dresser revolve around a vertical dresser-revolving shaft.

8. The dressing apparatus according to claim 7, further comprising:
- a revolving-shaft-moving unit that moves the dresser-revolving shaft.

9. An internal-gear grinding machine, comprising:
a dressing apparatus according to claim 8.

10. The dressing apparatus according to claim 7, further comprising:
- a revolving-radius-adjusting unit that adjusts the distance of the revolving radius of the disc dresser.

11. An internal-gear grinding machine, comprising:
a dressing apparatus according to claim 10.

12. An internal-gear grinding machine, comprising:
a dressing apparatus according to claim 7.

13. The dressing apparatus according to claim 6, wherein the relative-revolving unit further includes:
- a vertical dresser-rotating unit that makes the disc dresser rotate around a vertical dresser-rotating shaft, the vertical dresser-rotating shaft being parallel with the work-rotating shaft and passing on the center of the disc dresser, and
- a moving unit that makes the barrel worm shaped tool and the disc dresser move linearly within a horizontal plane.

14. An internal-gear grinding machine, comprising:
a dressing apparatus according to claim 13.

15. The dressing apparatus according to claim 6, further comprising:
- an oscillating unit that makes the disc dresser oscillate in the vertical direction while the disc dresser is revolving.

16. An internal-gear grinding machine, comprising:
a dressing apparatus according to claim 15.

17. An internal-gear grinding machine, comprising:
a dressing apparatus according to claim 6.

* * * * *